UNITED STATES PATENT OFFICE.

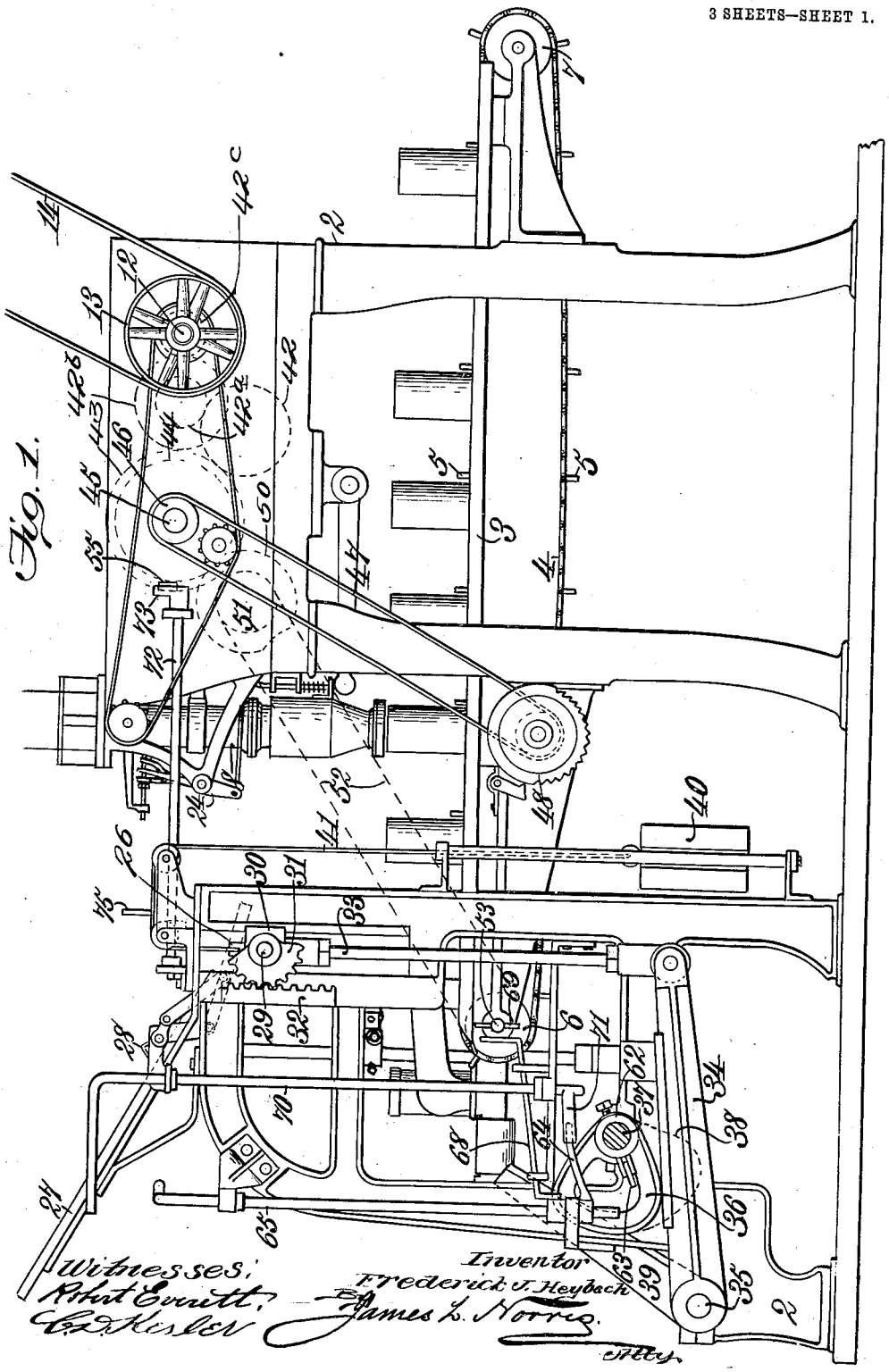

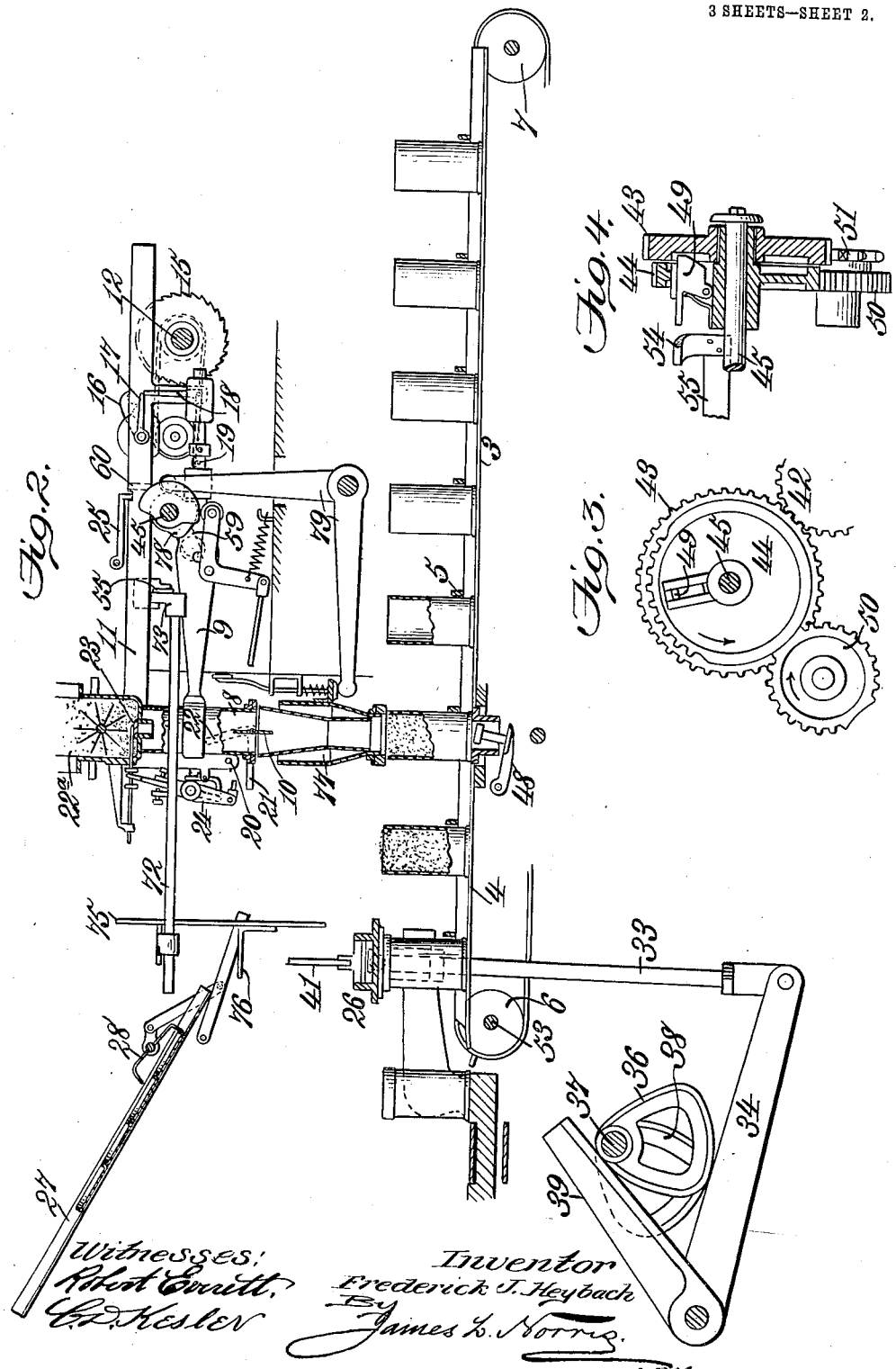

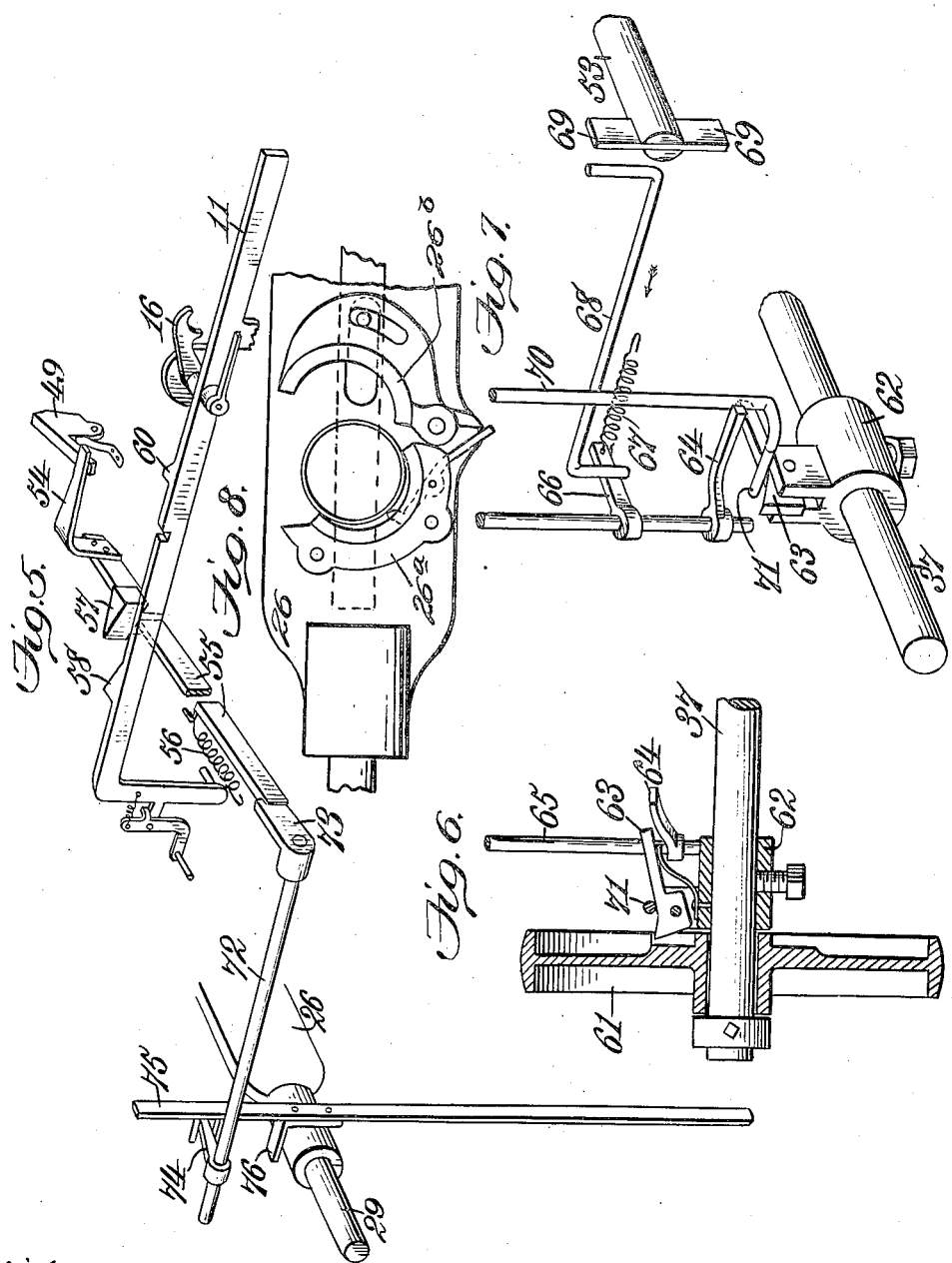

FREDERICK J. HEYBACH, OF SAVANNAH, GEORGIA, ASSIGNOR, BY DIRECT AND MESNE ASSIGNMENTS, TO THE AMERICAN AUTOMATIC MACHINERY COMPANY, OF SAVANNAH, GEORGIA, A CORPORATION OF GEORGIA.

FILLING AND CAPPING APPARATUS.

935,506.  Specification of Letters Patent.  Patented Sept. 28, 1909.

Application filed May 29, 1907. Serial No. 376,321.

*To all whom it may concern:*

Be it known that I, FREDERICK J. HEYBACH, a citizen of the United States, residing at Savannah, in the county of Chatham and State of Georgia, have invented new and useful Improvements in Filling and Capping Apparatus, of which the following is a specification.

This invention relates to filling and capping apparatus, although it is sometimes known as weighing and capping apparatus.

By the apparatus I weigh a charge of material and then deliver the same to a can to which a cap is afterward applied.

I desire it to be understood that I use both the terms "can" and "cap" in their broad meanings as by the apparatus I can deliver a weighed charge or load into any suitable receptacle whether it be specifically a can or not, and subsequently can apply to the said receptacle a closure which, in the case of a can, would be a cap or top.

By virtue of the organization outlined I obtain primarily accuracy which is an important consideration when the load is of small size, for example, in the neighborhood of a pound.

The invention does not reside in any particular form of weighing mechanism nor in any particular form of capping mechanism, but broadly in the combination between such mechanisms wherein one modifies or coöperates with the other, whereby accuracy and precision and a regular and determined sequence of operations are insured. In the present case, therefore, should anyone of these mechanisms become temporarily ineffective or cease its functions, the machine as a whole would not operate.

The present application covers by its claims certain features illustrated but not claimed in certain co-pending applications filed by me and hereinafter identified. I might state at the outset that some of the features claimed herein are disclosed in my co-pending application Serial No. 334,179, filed September 11, 1906.

In the drawings accompanying and forming part of this specification I have shown in detail one form of embodiment of the invention which, to enable those skilled in the art to practice the same, will be set forth in detail in the following description, while the novelty of the invention will be included in the claims succeeding said description.

Referring to said drawings: Figure 1 is a side elevation of an apparatus involving my invention. Fig. 2 is a longitudinal central sectional diagrammatic view of said apparatus. Fig. 3 is a detail view in elevation of a certain arrangement of gearing hereinafter more particularly described. Fig. 4 is a cross-sectional view of the parts shown in Fig. 3. Fig. 5 is a detail view in perspective of the connections between the capping and weighing mechanisms whereby the former can control the latter. Fig. 6 is a sectional detail view of clutch mechanism and certain coöperative parts. Fig. 7 is a perspective view of a portion of said clutch, the controlling means therefor, and certain adjacent parts. Fig. 8 is a detail face view of a cap carrying and transferring member.

Like characters refer to like parts throughout the several figures of the drawings.

The frame-work for supporting the different parts of the apparatus may be of any desirable character; that shown in the drawings is denoted in a general way by 2 and it consists of several columns or frame members connected in any desirable way. The said frame-work 2 is shown as supporting between its top and bottom a table as 3 along which the cans are fed preferably step by step in some suitable manner. For this purpose I have shown chains as 4 connected by strips or lags as 5 which latter are adapted to engage the cans, as clearly shown in Figs. 1 and 2. The chains 4 are shown as passing around the wheels 6 and 7. On each of the intermittent movements the two chains feed the cans a distance equal to that separating any of the two adjacent cans in said Figs. 1 and 2. The can-feeding means, as will hereinafter appear, presents initially a can to the weighing mechanism to receive a load therefrom and afterward to the capping mechanism, the capping mechanism being operative to apply a cap to the filled can. From what has been stated it will be apparent that the weighing and capping mechanisms may be of any desirable character. The weighing mechanism may, for example, be similar to that disclosed in Letters Patent No. 791,342, granted to me May 30, 1905, and to which reference may be had, while the capping mechanism may be like that disclosed in said application 334,179.

I deem it desirable to briefly refer to the principal parts of the weighing mechanism for the purpose of indicating the coöperation of the same with the capping mechanism. Said weighing mechanism involves a bucket as 8 supported by a scale-beam as 9, said bucket having at its bottom a closer or valve as 10 for controlling the discharge of the loads from said bucket. The beam 9 is fulcrumed between its ends and is provided on that end thereof opposite the one equipped with the bucket with a counterweight. The closer or valve 10 is alternately opened and closed by a power-operated member as 11 mounted for reciprocation.

The main shaft of the apparatus is denoted by 12 and it has fastened to one end thereof a pulley as 13 driven by a belt as 14 from some suitable prime driver. The shaft 12 is continuously rotative and it has fastened thereto a ratchet-wheel as 15 with which is coöperative a pivotally mounted gravity pawl as 16 on the reciprocatory member 11. Connected with the pawl 16 is an arm as 17 engageable by the normally vertically-disposed arm of the angularly-shaped latch 18 pivoted at its angle on a depending arm of the reciprocatory member 11 and engageable by a trip device as 19 near the counterweighted end of the scale-beam 9. With the bucket 8 up, the valve or closer 10 will be shut, a stream of material flowing at this time into the bucket. When the load is completed the trip device 19 will strike the latch 18 and disengage the latter from the arm 17 thereby permitting the point of the pawl 16 to drop into engagement with the teeth of the ratchet-wheel 15 for the purpose of advancing the member 11. The pawl 16 is then returned to its original position shown in Fig. 2, by the action of mutilated gearing operable from the main shaft 12. When the said member 11 has practically completed its advancing movement a pin as 20 on a depending arm thereof will strike the arm 21 of the closer or valve 10, to open the latter, as shown in said Fig. 2. On the backward or retractive stroke of the member 11 the pin 20 strikes the arm 22 of said closer 10 for the purpose of shutting the same, all as fully set forth in said Letters Patent.

The material in the form of a stream is delivered into the bucket 8 from a hopper as 22ª, the stream being controlled by a valve as 23 operable by mechanism such as that denoted in a general way by 24, from the member 11. The valve and the operating mechanism form in themselves no part of the present invention, but are claimed in my co-pending application Serial No. 334,180, filed September 11, 1906, for which reason I deem it unnecessary to describe said valve and operating mechanism herein. It might be well to state, however, that on the advancing movement of the member 11 the valve 23 is closed in two independent motions for the purpose of reducing the size of and then cutting off the supply stream flowing from the hopper 23, and that on the return or retractive stroke of said member 11, the valve 23 is opened. It is not essential, however, that the valve be closed in two independent movements; if desired, said valve may be opened and it may be also closed precisely as shown in said Patent 791,342.

On the frame-work or other fixed part of the apparatus is pivoted a gravity-latch as 25, the free end of which, when the member 11 has completed its advancing stroke, is adapted to automatically enter a notch in said member 11, as shown clearly in Fig. 2, to prevent accidental retractive movement of said member 11 and thereby accidental opening movement of the valve 23. At the proper stage in the operation of the machine, however, this latch 25 is lifted so that the member 11 can be subsequently retracted or returned to its original position.

The capping mechanism embodies a cap-transferring and applying member, such as that denoted in a general way by 26, and said cap-transferring and applying member has suitable means for clamping a cap and is supplied with the caps by a chute or run-way as 27, the delivery of the caps to the cap-transferring and applying member being controlled by detent means such as that denoted in a general way by 28 and fully shown and described in said application 334,179. The cap carrying and transferring member 26 is shown as provided with a fixed jaw 26ª and a pivoted jaw as 26ᵇ, the latter being movable toward the former to clamp a cap. When the jaws are closed the cap will be tightly held thereby but, by moving the pivoted jaw 26ᵇ away from the companion jaw 26ª, said cap will be released. When the cap-transferring and applying member 26 is up, it is in position to receive a cap from the chute or run-way. During its downward motion it carries the cap clamped thereby toward a filled can and, when said downward motion has been practically completed, the cap or top is applied to such can. Said device 26 is mounted, as will be clear, for vertical reciprocation and, in addition to such movement, it is capable of turning motion, all as fully set forth in said last mentioned application.

The cap-transferring and applying device 26 has at its opposite ends journals as 29 supported for turning motion by guide-blocks as 30. In the drawings only one journal or trunnion 29 and one guide-block 30 are shown. Said journal or trunnion is equipped with a segmental gear 31 meshing with a stationary rack as 32 carried by the frame-work of the machine, said segmental gear and rack 32 coöperating to turn the cap-transferring and applying member 26 during the descending motion thereof. To the blocks 30 are connected rods as 33, the lower ends of which are connected to rock-arms as 34 fastened to the rock-shaft 35. Only one rod 33 and one arm 34 are shown. The arm 34 is engagable by a cam as 36 on the intermittently-rotative shaft 37. When the shaft 37 is thrown into action by means of a one-revolution clutch or other suitable device, the cam 36, by acting against the arm 34, can impart a downward stroke to the latter for the purpose, through the intermediate described means, of drawing the cap-transferring and applying device 26 downward, during which motion said part 26 is turned. When said downward movement has been completed the cap carried by said cap-transferring and applying device will have been applied to a can previously filled with a load from the weighing mechanism. The shaft 37 is equipped with an additional cam as 38 coöperative with the arm 39 fastened on said shaft 35, and said cam 38, after the cam 36 has, as described. served to lower the cap-transferring and applying device, will act against the arm 39 to thereby, through the intermediate parts, return said cap-transferring and applying device to its elevated position. In Fig. 1 the shaft 37, is supposed to be at rest. When it is thrown into operation the cams 36 and 38 act successively against the arms 34 and 39 for vertically reciprocating the cap-transferring and applying device and, during this reciprocation, said device, as will be understood, is bodily turned.

A suitably guided weight is shown at 40. and from this weight rises the flexible part 41 which may consist of a rope or chain, and said part 41 passes over suitable guide-wheels rotatably mounted on the frame-work and is connected, as shown in Figs. 1 and 2, to the cap-transferring and applying device 26. The weight 40 aids the cam 38 in elevating said cap-transferring and applying device.

A gear is shown at 42 and said gear 42 meshes with the pinion 42ª fixed to a shaft to which is also fixed a gear 42ᵇ meshing with the pinion 42ᶜ fixed to the continuously operative main shaft 12, as shown in Fig. 1. The gear 42 which it will be understood is continuously operative meshes in turn with a gear as 43 loose on the hub of the gear 44, the gears 43 and 44 being, as will hereinafter appear, intermittently clutched together. Said gear 44 is suitably fastened to one end of the shaft 45, while the opposite end of said shaft is equipped with a wheel as 46 connected by a belt as 47 with the tapping mechanism denoted in a general way by 48. Said tapping mechanism forms in itself no part of the present application, for which reason it is not described in detail; it is fully illustrated and described in Letters Patent No. 868,605, granted to me October 15, 1907, and to which reference may be had. The tapping mechanism is timed to operate on a filled can prior to the movement of the can-feeding means to move the filled can away from the weighing mechanism and toward the capping mechanism. The gear 44 is a mutilated gear and it pivotally carries a clutch finger as 49 the operation of which will be hereinafter set forth, and its teeth are adapted on each complete rotation thereof to engage one series of the two series of teeth on the mutilated gear 50, the shaft of which latter has fastened thereto a wheel as 51 connected by belt-gearing denoted in a general way by 52, with the forward shaft 53 of the can-feeding means or chains 4.

It will be understood that, when the gears 43 and 44 are clutched together, the gear 44 is given one full turn or revolution and, during this motion, it turns the gear 50 a half revolution, said gear 50, by means of its connection with the can-feeding means, moving the latter one step. It will be assumed that a can has been filled. The action of the gear 44 is such that the tapping mechanism 48 can operate after the load is in the can and before the teeth of the mutilated gear 44 mesh with one of the series of teeth on the gear 50. As soon as the tapping operation has been concluded the teeth of the gear 44 will engage one of the series of teeth of the gear 50 to give the latter a half turn and to effect the operation of the can-feeding means in the manner referred to. The clutching member or pivotally-mounted finger 49 carried by the gear 44 is movable into its working relation by a spring and is normally held out of such working relation by a detent as 54 which normally engages the tail of said clutch member, as shown in Fig. 5 and which consists of a curved or bent arm fastened to one end of the slide 55, which slide is given a working stroke by a spring as 56 connected therewith and also with the frame-work of the machine or some other suitable fixed part. The said slide or controlling device 55 has fastened thereto a wedge as 57 coöperative with a wedge as 58 on the adjacent face of the power-operated reciprocatory member 11.

When the member 11 is in its backward position the beveled face of the wedge 58 will be against the corresponding face of the wedge 57 so as to positively hold the slide or controlling member 55 in its retracted position with the holding device or detent 54 in engagement with the tail of the clutching member 49. It therefore follows that, when the member 11 is advanced in the manner previously set forth, the wedge 58 will release the wedge 57 so that the controlling member, slide, or bolt 55 can be advanced by its spring, assuming that said controlling member 55 has been released by means governed by the capping mechanism. The part 55 is shown as having been released by the member 11 in Fig. 5, although it is held against motion under the influence of the spring 56 by means under the control of the capping mechanism. It will be assumed that such last-mentioned means has been released. The member 55 can therefore be advanced by the spring 56 so as to carry the holding device or detent 54 off the tail of the clutching member or pawl 49, thereby permitting the spring of the latter to throw the same into engagement with the continuously operative gear 43. When this takes place the gear 44 can be turned to effect, through the intermediate parts, the functions heretofore set forth. It will be understood that on the forward motion of the member 11 the load from the bucket 8 is discharged therefrom into a can in vertical line with said bucket, and situated over the tapping mechanism, which, during the delivery of the load into the can, is at rest. When the load is in the can under the bucket, said can is tapped to densify or solidify the mass therein. On the return of the member 11 the wedge 58 will ride against the wedge 57 so as to retract the controlling member or slide 55 to bring the detent or holding member 54 into position to engage the clutching member or pawl 49 when the gear 44 has made one full turn.

The shaft 45 has fastened thereto an actuator which may consist of an arm as 59 which, when said shaft has nearly completed its movement, is adapted first to engage and lift the latch 25 to release the member 11 and to afterward operate against a shoulder as 60 on said member 11 to return the latter to its original position, during which motion, as will be understood, the valve or closer 10 is shut and the valve 23 consequently opened.

The shaft 37 loosely carries a suitable driven member as the pulley 61 which is continuously operative and which is adapted to be clutched intermittently to the said shaft 37 by means of a one-revolution clutch involving in its make-up a sleeve as 62 pinned or otherwise fastened to said shaft and having a pivotally mounted clutching member or finger as 63 thereon, spring actuated toward its working position but normally held against such movement by a detent as 64 fastened to the vertically-disposed rock-shaft 65, the latter in turn having an arm as 66 to which one end of a spring as 67 is connected, the spring serving to normally hold the detent 64 in its effective position and the arm 66 against the down-turned end of the push-rod 68.

The shaft 53 of the can-feeding means has wings as 69 adapted on each step movement of said can-feeding means to thrust the push-rod 68 in the direction of the arrow in Fig. 7. It will be assumed that the can-feeding means has been operated and, when operated, one of the wings 69 will thrust said push-rod in the direction indicated, thereby turning the rock-shaft 65 and moving the detent 64 from off the clutching member 63, whereby the spring of the latter can move the same into engagement with the pulley 61 to impart to the shaft 37 one full turn. The instant that a wing 69 passes free of the push-rod 68 the latter is, by the power of the spring 67, returned to its original position, so as to also move the detent 64 to its original position, as shown in said Fig. 7, whereby, when the sleeve 62 has made practically one complete turn, the tail of the clutching member 63 can pass under the detent 64 to effect the movement of the clutching member 63 out of engagement with the pulley 61, to thereby stop the rotation of said shaft 37. It will be understood that the push-rod 68 is alternately operated by the two wings 69 and that the latter in the present instance normally stand vertically. On the rotation of the shaft 37 under the action of the clutching mechanism just described, the cap-transferring and applying device 26 is moved down with a cap, for applying said cap to a filled can, after which said cap-transferring and applying device is moved up, the reciprocation of the latter being effected by the successive action of the cams 36 and 38 in the manner previously set forth.

Should I desire to throw the capping mechanism out of operation at any time, this result can be accomplished by the action of the manually-operable spindle 70 vertically disposed and turnable to carry the working portion 71 thereof against the tail of the clutching member or pawl 63. Normally this working portion 71 is above and perpendicular to the axis of motion of the clutching member 63 so as to be ineffective.

The weighing mechanism is controlled by the capping mechanism, and the capping mechanism is controlled by the can-feeding mechanism. It will be clear from what I have stated how the capping mechanism is thrown into action by the can feeding mechanism. I will now set forth the means for insuring the correct action of the weighing mechanism by the capping mechanism. A rock-shaft is shown at 72, said rock-shaft being suitably supported by the frame-work of the machine and having at one end thereof a latch as 73 for the controlling member or slide 55, and at the other end an arm as 74 supported between the branches of a bifurcation or between two pins extending laterally from a vertically-movable rod as 75, said rod having a projection as 76 below the said bifurcation engageable by the cap-transferring and applying device 26. When the said cap-transferring and applying device is up the latch 73 will be in a position to release the member 55 so that, should the member 11 be in its forward position or that in which the wedge 58 releases the wedge 57, the controlling member 55 can be shot forward by its spring 56 to permit the clutching member 49 to operate in a manner previously set forth to obtain the described functions.

In Fig. 5 the member 11 is in its forward position, the wedge 58 being in a position to release the wedge 57. The member 55, however, is not released, being held by the latch 73 under the control of the capping mechanism, the cap-transferring and applying device 26 at this time descending in the act of applying a cap to a filled can to the left of the weighing mechanism, there being, as will be also understood, a filled can under the weighing mechanism and both cans being at rest. After the cap has been applied the device 26 ascends and, when it has practically completed its upward movement, it strikes against the projection 76, thrusting the rod 75 upward and rocking the arm 74 in a similar direction to cause, through the shaft 72, the elevation of the latch 73, whereby the latter will release the controlling member 55. When this occurs the said controlling member 55 is operated by its spring 56 to carry the holding device or detent 54 from off the tail of the clutching member 49, whereby the latter can be moved into engagement with the gear-wheel 43 to cause the movement of the feeding means 4 in the manner previously set forth and to also cause, as described, the return movement of the member 11, during which the wedge 58, by acting against the wedge 57, retracts the member 55 to move the holding member or detent 54 into position to disengage the clutch member 49 from the gear 43.

I arrange between the bucket 8 and a can to be filled a telescopic member such as that denoted in a general way by 77, which prevents waste of material delivered from the weighing mechanism into a can. This telescopic member forms in itself no part of the present invention, but is claimed in Letters Patent No. 874,911, granted to me December 24, 1907, and to which reference may be had. It is controlled by a cam as 78 on the shaft 45, which cam operates against said telescopic member through an angle lever as 79.

It is believed the operation of the apparatus will be clearly evident from what has been previously stated. Briefly set forth it is as follows: A load is made up in the bucket 8. The bucket then on the advancing motion of the member 11 is caused to discharge the load into a can vertically alined with said bucket, after which the contents are tapped by the tapping mechanism 48. Following this the can-feeding mechanism 4 is advanced one step so as to advance the can with the load toward the capping mechanism. The parts are so proportioned that two steps of the can-feeding mechanism will be made before the can is positioned under the capping mechanism. When the can with its load is in position to receive a cap from the capping mechanism, such can at this time being at rest, the capping mechanism is set in motion so as to apply the cap to the can and, when the device 26 has nearly reached its original position, it strikes the projection 76 so as to release the clutching member 49 in the manner previously set forth, to repeat the operation. A load is being made up in the bucket 8 and is discharged therefrom into an empty can during the movement of the member 26, so that, when the latter reaches its upper position after the application of a cap to a can, all will be in readiness for the movement of the can-feeding means to move the loaded can from under the weighing bucket 8 and to move an empty can into position to receive a load.

The cans are ordinarily supplied to the feeding means 4 by hand and are moved from off said feeding means in the manner fully set forth in my said application Serial No. 334,179.

What I claim is:

1. In an apparatus of the class described, the combination of a mechanism for supplying predetermined charges of material to cans or other receptacles, capping mechanism, and means releasable by the capping mechanism for controlling the operation of the charge supplying mechanism.

2. In an apparatus of the class described, the combination of a can filling mechanism, a capping mechanism, means controlled by the filling mechanism for setting the capping mechanism into operation, and means controlled by the capping mechanism for setting the filling mechanism into operation.

3. In an apparatus of the class described, the combination of weighing mechanism, capping mechanism, means between the two mechanisms for mutually controlling one by the other, and means to support a can in position to receive a charge from the weighing mechanism and subsequently a cap from the capping mechanism.

4. In an apparatus of the class described, the combination of weighing mechanism and capping mechanism, the latter mechanism controlling the action of the former mechanism.

5. In an apparatus of the class described, the combination of weighing mechanism, capping mechanism, and means between the two mechanisms and releasable by the capping mechanism for preventing a second discharge of the weighing mechanism until the capping mechanism has completed its operation.

6. In an apparatus of the class described, the combination of weighing mechanism, capping mechanism coöperative therewith, movable means for positioning a can to first receive a charge of material from the weighing mechanism and afterward to receive a cap from the capping mechanism and controlling means for the weighing and positioning means releasable by the capping mechanism.

7. In an apparatus of the class described, the combination of can filling mechanism, capping mechanism, can feeding mechanism coöperative with the filling and capping mechanisms, and means controllable by the capping mechanism for preventing operation of the filling or can feeding mechanisms until the operation of the capping mechanism has been properly completed.

8. In an apparatus of the class described, the combination of weighing mechanism, an automatically-operable controlling device therefor, means for holding the controlling device against action, and can-capping mechanism for effecting the release of said controlling device.

9. In an apparatus of the class described, the combination of weighing mechanism, an automatically-operable controlling device for the weighing mechanism, a detent for holding the controlling device against movement, can-capping mechanism, and means operative with the can-capping mechanism for tripping said detent to release said controlling device.

10. In an apparatus of the class described, the combination of weighing mechanism, a spring-operated controlling device for the weighing mechanism, a detent to hold the controlling device against movement by its spring, capping mechanism, and means operative by the capping mechanism for tripping said detent to free the controlling device.

11. In an apparatus of the class described, the combination of weighing mechanism, can-capping mechanism having a cap-transferring and applying member movable from a cap-receiving to a cap-applying position, controlling means for the weighing mechanism, and means for causing the action of said controlling means when the cap-transferring and applying member is in its cap-receiving position.

12. In an apparatus of the class described, the combination of weighing mechanism, capping mechanism, and movable can-feeding mechanism, coöperative with each other, the capping mechanism being provided with means for throwing another of said mechanisms into action.

13. In an apparatus of the class described, the combination of capping mechanism, means for operating the capping mechanism, including a one-revolution clutch, can-feeding mechanism, means operated from the can-feeding mechanism for throwing said clutch into action, and weighing mechanism controlled by the capping mechanism.

14. In an apparatus of the class described, the combination of capping mechanism, driving mechanism for the capping mechanism, including a one-revolution clutch provided with an automatically-operable pawl, can-feeding mechanism, means operable by the can-feeding mechanism for permitting the action of the pawl to cause the action of the capping mechanism, and weighing mechanism controlled by said capping mechanism.

15. In an apparatus of the class described, the combination of can-capping mechanism, a power-operated member, can-feeding mechanism, mechanism thrown into action by the can-feeding mechanism for throwing the capping mechanism into working relation with said power-operated member to cause the action of said capping mechanism, and weighing mechanism controlled by said capping mechanism.

16. In an apparatus of the class described, the combination of can-capping mechanism, feeding mechanism for cans, driving mechanism for the can-capping mechanism, including a clutch, means operable by the can-feeding mechanism to throw said clutch into action to cause the operation of the capping mechanism, and weighing mechanism controlled by the capping mechanism.

17. The combination of weighing mechanism, can-feeding means, means controlled by the weighing mechanism for controlling the can-feeding means, capping mechanism, means operative with the can-feeding mechanism for throwing the capping mechanism into action, and means between the capping and weighing mechanisms for controlling the action of the weighing mechanism.

18. The combination of weighing mechanism including a bucket, a power-driven member, a reciprocatory device, means operable on the completion of a load in said bucket for putting said reciprocatory device into driving connection with said power-driven member to advance said reciprocatory device and discharge the load from said bucket, capping mechanism, and power-controlled means governed by said capping mechanism for causing the retractive movement of said reciprocatory device.

19. The combination of weighing mechanism including a bucket, a power-driven member, a reciprocatory device, means operable on the completion of a load for putting said reciprocatory device into operative relation with said power-driven member to advance said reciprocatory device and cause the discharge of the load in said bucket, capping mechanism, power-controlled means governed by said capping device for causing the retractive movement of said reciprocatory device, and can-feeding means operable by said power-controlled means for presenting a can successively to the weighing mechanism and capping mechanism and having means for throwing said capping mechanism into action.

20. The combination of weighing mechanism including a bucket, a power-driven member, a reciprocatory device, means operable on the completion of a load in said bucket for putting said reciprocatory device into operative relation with said power-driven member to advance said reciprocatory device and cause the discharge of the load from said bucket, capping mechanism, a power-controlled member, a controlling device for normally holding said power-controlled member in an inoperative relation, and means controlled by the capping mechanism for normally holding the controlling device against action.

21. The combination of weighing mechanism including a bucket, means for automatically discharging the load from the bucket, capping mechanism, and means for preventing the action of the weighing mechanism until said capping mechanism has reached substantially its cap-receiving position.

22. The combination of weighing mechanism including a bucket, capping mechanism movable from a cap-receiving to a cap-applying position and having also a return movement, means for presenting a can successively to the weighing and capping mechanisms, and means governed by the capping mechanism for holding the weighing mechanism out of action until said capping mechanism has reached a predetermined position.

23. The combination of weighing mechanism including a bucket, a reciprocatory device operable on its advancing movement to effect the discharge of the load from said bucket, capping mechanism, and means coöperative with the capping mechanism for preventing a complete reciprocation of said reciprocatory device until the capping mechanism has reached a certain point in its operation.

24. The combination of weighing mechanism including a bucket, power-controlled means for effecting the discharge of said bucket, capping mechanism, can-feeding means to successively move a can to the weighing and capping mechanisms, and mechanism controlled by the capping mechanism for causing the movement of said can-feeding means.

25. The combination of weighing mechanism including a bucket, a power-operated member, a reciprocatory device, means operable at a predetermined point in the action of the weighing mechanism for throwing said reciprocatory device into operative relation with said power-operated member to advance the former and cause the discharge of the load from said bucket, a one-revolution clutch having a detent, a controlling device to normally hold said detent against movement, capping mechanism, means operable by the capping mechanism when the same reaches a predetermined point to release said controlling device and thereby said detent to cause the action of said one-revolution clutch, and means coöperative with said one-revolution clutch for imparting a retractive movement to said reciprocatory device.

26. The combination of weighing mechanism including a bucket, a power-operated member, a reciprocatory device, means coöperative with the weighing mechanism for throwing said reciprocatory device into coöperative relation with said power-driven member for causing an advance movement of the former and the discharge of the load from said bucket, capping mechanism, can-feeding means for presenting a can successively to the weighing and capping mechanisms, a one-revolution clutch including a detent, an automatically-operative controlling device provided with means for normally holding said detent against action, means actuated by the capping mechanism for effecting the release of said controlling device at a predetermined point to permit the advancing movement of said controlling device and thereby the operation of said clutch, and means operated by said one-revolution clutch for moving said can-feeding means and for also retracting said reciprocatory device.

27. The combination of weighing mechanism including a bucket, a power-operated member, a reciprocatory device, means coöperative with the weighing mechanism for throwing said reciprocatory device into coöperative relation with said power-driven member for causing an advance movement of the former and the discharge of the load from said bucket, capping mechanism, can-feeding means for presenting a can successively to the weighing and capping mechanisms, a one-revolution clutch including a detent, an automatically-operative controlling device provided with means for normally holding said detent against action, means actuated by the capping mechanism for effecting the release of said controlling device at a predetermined point to permit the advancing movement of said controlling device and thereby the operation of said clutch, and means operated by said one-revolution clutch for moving said can-feeding means and for also retracting said reciprocatory device, the latter being provided with means for retracting said controlling device.

28. In an apparatus of the class described, the combination of mechanism for supplying predetermined charges of material, mechanism for capping receptacles after receiving such charges, and means controllable by the capping mechanism for preventing operation of the charge supplying mechanism before the other has properly completed its respective operation.

29. In an apparatus of the class described, the combination of mechanism for supplying predetermined charges of material, mechanism for applying caps to receptacles after receiving such charges, and means controllable by the capping mechanism for preventing a second operation of the charge supply mechanism until after the capping mechanism has properly completed its operation.

30. In an apparatus of the class described, the combination of mechanism for supplying predetermined charges of material, mechanism for applying caps to receptacles after receiving such charges, means releasable by the charge supplying mechanism after the latter has actually supplied the proper quantity of material for permitting a subsequent operation of the capping mechanism and controlling means for preventing subsequent operation of the charge supplying mechanism until the capping mechanism has properly completed its operation.

31. In an apparatus of the class described, the combination of a weighing mechanism, capping mechanism, and means for preventing a second discharge by the weighing mechanism before the capping mechanism has properly completed its operation.

32. In an apparatus of the class described, the combination of weighing mechanism, capping mechanism, and locking means releasable after the capping mechanism has completed its operation for permitting a subsequent operation of the scale of the weighing mechanism.

33. In an apparatus of the class described, the combination of weighing mechanism and capping mechanism each capable of separately performing its respective operation, and mutually controlled means releasable by one of said mechanisms after such mechanism has completed its operation for permitting a subsequent operation of the other mechanism.

34. In an apparatus of the class described, the combination of weighing mechanism, capping mechanism, operating means for the respective mechanisms, and controlling means independent of the operating means and operative mutually by said mechanisms for preventing the operation of either one of said mechanisms before the other has completed its operation.

35. In an apparatus of the class described, the combination of mechanism for feeding cans or receptacles, mechanism for supplying predetermined charges of material to the cans, capping mechanism, and means for preventing movement of the can feeding means until after the capping mechanism has completed its operation.

36. In an apparatus of the class described, the combination of a can feeding mechanism, weighing and capping mechanisms both mounted in coöperative relation with the can feeding means, the cans being supported upon said feeding means during the weighing and capping operations and means for preventing movement of said can feeding mechanism before the capping mechanism has completed its operation.

37. In an apparatus of the class described, the combination of a can feeding mechanism, and weighing and capping mechanisms both mounted in coöperative relation with the can feeding means, and controlling means for preventing operation of one of said mechanisms until the operation of the capping mechanism has been completed.

38. In an apparatus of the class described, the combination of a weighing mechanism, capping mechanism, and can feeding means for supporting cans or receptacles during the weighing and capping operations and operable to simultaneously position one can to receive a charge and another can to receive a cap, the can feeding means having mechanism for controlling its operation from the capping mechanism.

39. In an apparatus of the class described, the combination of a can feeding means, mechanism for supplying predetermined charges of material to cans supported thereon, a capping mechanism, means operative by the capping mechanism for controlling the operation of the charge supplying mechanism, and means for detaining the operation of the capping mechanism until a can has been properly positioned relatively thereto.

40. In an apparatus of the class described, the combination of weighing mechanism, capping mechanism, driving means for the respective mechanisms, and controlling means between said driving means involving a clutch which is detained in disconnected condition until one of said mechanisms has completed its operation.

41. In an apparatus of the class described, the combination of weighing mechanism, capping mechanism, means releasable by the weighing mechanism after the latter has actually delivered a predetermined quantity of material for controlling the operation of the capping mechanism and means releasable by the capping mechanism for controlling the subsequent operation of the weighing mechanism.

42. In an apparatus of the class described, the combination of weighing mechanism, means for feeding cans or other receptacles to the weighing mechanism, means releasable by the weighing mechanism after the latter has actually delivered a predetermined quantity of material for controlling the operation of the can feeding means, and means for controlling the subsequent operation of the weighing mechanism.

43. In an apparatus of the class described, the combination of can feeding means, weighing mechanism and capping mechanism both mounted in coöperative relation with the can feeding means, means releasable by the weighing mechanism after the latter has actually delivered a predetermined quantity of material to a can supported on said can feeding means for controlling the operation of the latter, means releasable by the can feeding means for controlling the operation of the capping mechanism and means releasable by one of said mechanisms for controlling the operation of the weighing mechanism.

In testimony whereof I have hereunto set my hand in presence of two subscribing witnesses.

FREDERICK J. HEYBACH.

Witnesses:
E. FITZGERALD,
WM. KEHOE.